United States Patent [19]

Fathauer et al.

[11] Patent Number: 4,507,131
[45] Date of Patent: Mar. 26, 1985

[54] ELECTRONIC AIR FILTERING APPARATUS

[75] Inventors: George H. Fathauer, Mesa, Ariz.; James M. Fowler, Jr., Houston, Tex.; Edward J. Rylicki, Powell; Edwin E. Mason, Rockbridge, both of Ohio

[73] Assignee: Masco Corporation of Indiana, Taylor, Mich.

[21] Appl. No.: 522,861

[22] Filed: Aug. 12, 1983

Related U.S. Application Data

[62] Division of Ser. No. 285,417, Jul. 22, 1981, Pat. No. 4,410,934.

[51] Int. Cl.³ .......................... B03C 3/32; B03C 3/68
[52] U.S. Cl. ........................ 55/104; 55/105; 55/106; 55/139; 323/903
[58] Field of Search ............. 55/4, 104–106, 55/139; 323/237, 320, 903

[56] References Cited

U.S. PATENT DOCUMENTS

| B 490,806 | 2/1976 | Baysinger | 55/105 |
|---|---|---|---|
| 3,140,935 | 7/1964 | Flagg | 55/139 |
| 3,374,609 | 3/1968 | Kide | 323/903 |
| 3,404,331 | 10/1968 | Winograd | 323/237 |
| 3,747,301 | 7/1973 | Glover et al. | 55/104 |
| 3,877,896 | 4/1975 | Muskovac | 55/105 |
| 3,938,059 | 2/1976 | Canning | 323/903 |
| 4,061,961 | 12/1977 | Baker | 55/105 |
| 4,133,653 | 1/1979 | Soltis | 55/126 |
| 4,267,502 | 5/1981 | Reese et al. | 323/903 |
| 4,300,090 | 11/1981 | Weber | 323/237 |
| 4,326,860 | 4/1982 | Laugesen | 323/903 |
| 4,335,414 | 6/1982 | Weber | 55/105 |

FOREIGN PATENT DOCUMENTS 498018 3/1976 U.S.S.R. .......................... 55/105

Primary Examiner—David L. Lacey
Attorney, Agent, or Firm—Neuman, Williams, Anderson & Olson

[57] ABSTRACT

Air filtering apparatus includes a filter cell having ionizing and collecting structure, a high voltage power supply and control unit for supplying a high voltage to the filter cell, a separate low voltage power supply unit for supplying operating power to the high voltage power supply unit and a separate probe unit for monitoring the flow of air within a duct in which the filter cell is installed. The high voltage power supply and control unit includes an output transistor in series with a primary winding of a step-up transformer and controlled by an oscillator circuit which is operative to control and limit the output voltage and current and also the current through the output transistor. The probe unit includes a pair of thermistors and a bridge circuit and operates to provide a signal which is independent of variables other than air flow velocity. A modified apparatus is also disclosed, arranged for portable use and arranged for energization from a standard power line with no separate low voltage supply.

5 Claims, 9 Drawing Figures

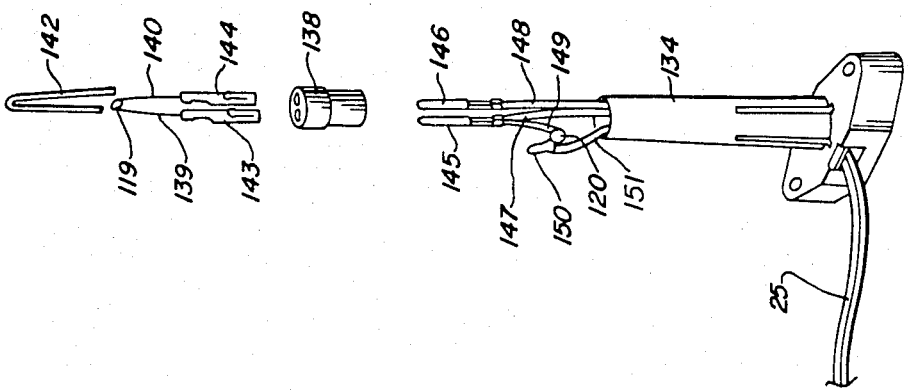
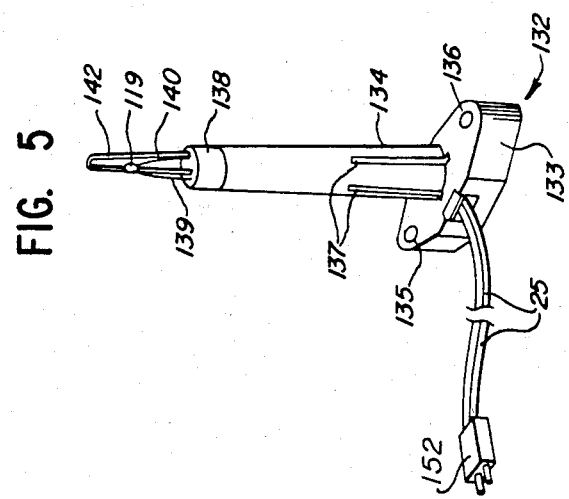

ELECTRONIC AIR FILTERING APPARATUS

This application is a division of our prior application Ser. No. 285,417, filed July 22, 1981, now U.S. Pat. No. 4,410,934, issued Oct. 18, 1983.

This invention relates to electronic air filtering apparatus and more particularly to apparatus which is highly efficient and reliable in removal of pollen, allergens, smoke and odors as well as dust, lint and other airborne particles. One embodiment is adapted to be readily installed in existing forced-air systems while another embodiment is of portable form and adapted to be carried from room to room. Both embodiments are readily and economically manufacturable and can be easily cleaned as required. They are very quiet and efficient with minimal power consumption.

BACKGROUND OF THE INVENTION

Electronic air filters have heretofore been proven to be effective in the removal of airborne particles. One highly effective type of filter cell is disclosed in the Soltis U.S. Pat. No. 4,133,653 issued Jan. 9, 1979. In the cell as disclosed in the Soltis patent, the air is passed through a pre-filter and passed an ionizing wire to collecting means which may include a pair of polyurethane webs with a high voltage grid sandwiched therebetween, a high voltage source being connected to the ionizing wire and the high voltage grid. An intensive electrostatic field is formed around the wire, bombarding particles entrained in the air and imparting a charge thereto. Then, as the charged particles enter the collection zone, they encounter the charged webs and are attracted to and precipitated thereon. Such a cell may be occasionally cleaned by soaking it in a suitable detergent.

Although highly effective, such electronic air filters have not been in very extensive use, partly because of the time and expense required for installation thereof. Also, the cost of manufacture of components, especially the high voltage supply, has been quite high.

Another problem with prior air filtering apparatus has been that they have required a substantial degree of attention on the part of the owner or operator to make sure that they are operating effectively.

SUMMARY OF THE INVENTION

This invention was evolved with the general object of providing electronic air filtering apparatus which can be readily and economically manufactured while being highly efficient and reliable in operation.

Another object of the invention is to provide electronic air filtering apparatus which can be readily installed in existing forced-air systems.

A further object of the invention is to provide an electronic air filtering apparatus of portable form.

In a system constructed in accordance with the invention, a "fly back" type of power supply is used which is similar in some respects to the type of power supply used for supplying a high voltage to picture tubes of television receivers. A driver circuit is provided for energizing the primary winding of a step-up transformer from a low voltage source, rectififer means being connected to the secondary winding of the transformer to develop a high DC operating voltage for application to the ionization means. The driver circuit includes an oscillator circuit which is operable at a high frequency to periodically switch an output transistor between conductive and non-conductive states. By operating at a high frequency, insulation requirements and component sizes can be greatly reduced, as compared with power supplies in which a transformer is operated at the standard power line frequency of 60 Hz.

An important feature of the invention relates to the control of operation of an energizing circuit in response to changes in operating conditions, especially with respect to conditions which may produce arcing in the ionizing means. A circuit arrangement is provided for sensing output current and to respond to an increase in output current above a certain value to switch an output transistor to its non-conductive state and to then prevent switching of the output transistor to its conductive state. The response time of the circuit is substantially instantaneous so that the possibility of production of ozone or other deleterious effects is substantially obviated.

In accordance with a specific feature, an oscillator circuit is provided which includes means for responding to an increase in the current through the output transistor above a certain value to switch the oscillator circuit to a state in which the output transistor is non-conductive. In this way, the possibility of damage to the output transistor may be minimized. Preferably, a circuit arrangement is provided to increase the speed of response and to further minimize the possibility of excessive current through the output transistor.

Another important feature of the invention relates to the provision of circuitry which allows periodic cleaning of a filter cell while obtaining safe and reliable operation. A high degree of skill and attention on the part of the user of the equipment is not required. In particular, it is found that limiting output current is very important not only in preventing possible damage to components of the apparatus, but also in that when an excessive current is the result of arcing in the filtering apparatus, there may be a generation of ozone and other deleterious effects.

It is also found to be desirable to clean the filter cell periodically, preferably by soaking in a detergent. If the filter cell is not sufficiently dry when it is replaced in a system, the moisture may cause arcing to occur. At the same time, it is desirable to be able to replace the cell as soon as conveniently possible and to also be able to energize the power supply system, without delaying operation indefinitely while waiting for the filter cell to dry.

In accordance with the invention, means are provided for responding to excessive current drain to deactivate the high power supply for a certain time interval and to then reactivate the high power supply. If, when reactivated, the filter cell is not dry or if another condition exists which precludes proper operation, the power supply may be de-energized and may be re-energized only after waiting for a certain time interval. As a result, the equipment is protected, the operation of the system is very convenient and the generation of ozone in any substantial quantity is obviated. Preferably, the time interval of deactivation of the power supply is of the same order of magnitude as the minimum time required for drying of the filter cell.

Further important features of the invention relate to the circuitry for controlling deactivation and reactivation of the power supply.

The power supply circuitry incorporates other specific features operative to obtain a high degree of reliability in the operation thereof.

BRIEF DESCRIPTION OF THE DRAWINGS

FIG. 4 is a front elevational view of a cover of the high voltage supply and control unit of FIG. 1;

FIG. 5 is a perspective view illustrating a probe unit of the apparatus of FIG. 1;

FIG. 6 is a perspective view showing the manner of assembly of components of the probe unit of FIG. 5;

DESCRIPTION OF PREFERRED EMBODIMENTS

Figure 1:
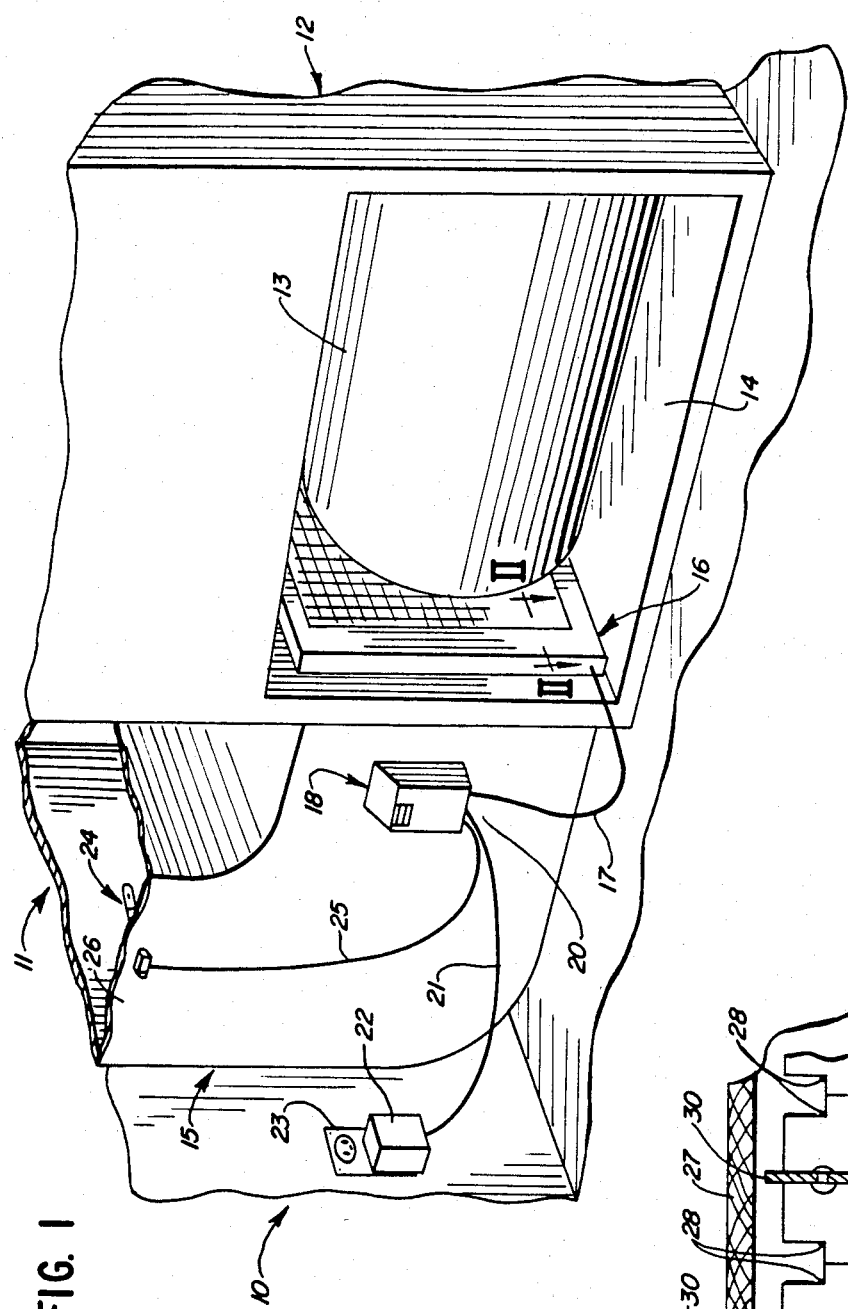
FIG. 1 is a perspective view illustrating air filtering apparatus constructed in accordance with the invention, shown installed in a forced-air system.

Reference numeral 10 generally designates air filtering apparatus constructed in accordance with the principles of this invention. The illustrated apparatus 10 is shown installed on a forced-air system 11 which includes a furnace 12 having a blower 13 within a chamber 14. The furnace 12 may further include a plenum, not shown, for receiving air from the outlet of the blower 13 and a burner, also not shown, for heating the plenum. Suitable duct work may be provided for receiving heated air from the plenum and for transmitting the heated air to the various rooms of the house in which the system is installed. A return duct 15 is provided for return flow of air to the furnace 12. It will be understood that the forced-air system may include air cooling means in addition to or in place of the heating means as described.

The apparatus 10 includes a filter cell 16 shown installed at the end of the duct 15, where the duct 15 joins the chamber 14 in which the blower 13 is located. The filter cell 16 may replace the ordinary disposable filter, in an existing forced-air system, and may be readily installed by simply sliding it into place in the slot in which the ordinary disposable filter is installed.

The filter cell 16 includes ionizing and collecting means requiring a high DC operating voltage which is supplied through a cable 17 from a high voltage power supply and control unit 18 shown mounted on a side wall portion 20 of the duct 15. The high voltage power supply and control unit 18 is connected through a cable 21 to a low voltage power supply unit 22 which is shown mounted on an electrical outlet box 23. The low voltage power supply unit 22 may suppy a DC voltage of approximately 24 volts, for example, at a safe level such as to minimize hazards to operation of the apparatus.

The apparatus 10 further includes a probe unit 24 which is connected through a cable 25 to the high voltage power supply and control unit 18. The probe unit 24 senses the flow of air within the duct 15 and is shown mounted on a side wall portion 26 of the duct 15 which is spaced from the filter cell 16 and which is also spaced from the high voltage power supply and control unit 18. The apparatus 10 is thus designed for easy installation in forced-air systems and can be readily installed by experienced "do-it-yourselfers" or by professional installers.

Figure 2:
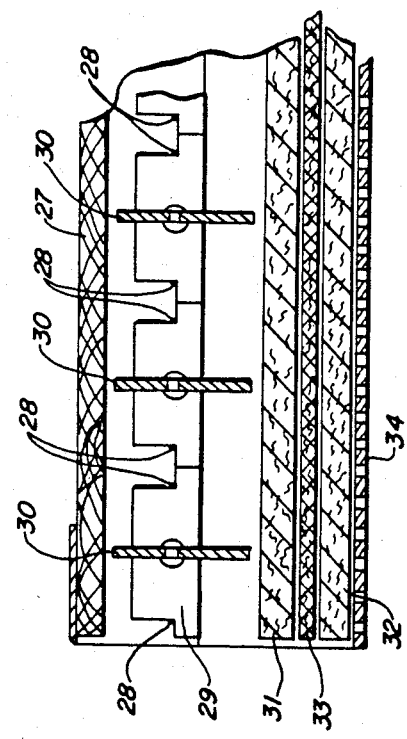
FIG. 2 is a cross-sectional view of a portion of a filter cell of the system of FIG. 1, taken substantially along line II—II of FIG. 1.

The filter cell 16 may desirably be constructed as disclosed in the aforesaid Soltis U.S. Pat. No. 4,133,653. As illustrated in the partial cross-sectional view of FIG. 2, it may include a pre-filter 27 which may be fabricated from fiberglass, woven and/or non-woven textile and open cell polymeric resin foam filter materials. In addition, it includes an ionizing wire 28 which is supported on insulators 29 which are mounted on spaced parallel blades 30. In addition, collecting means are provided including a pair of polyurethane webs 31 and 32 with a high voltage grid 33 sandwiched therebetween. A protective grill 34 may be provided on the outlet side of the filter cell 16. The high voltage cable 17 is connected to the ionizing wire 28 and to the high voltage grid 33 in a conventional manner, for example, through mounting posts, bus bars, printed circuit boards such as described in U.S. Pat. No. 3,727,380. When the high voltage is applied, an intensive electrostatic field is formed around the wire 28 which causes an ion flow between the wire 28 and the blades 30, bombarding particles entrained in the air and imparting a charge thereto. As the charged particles enter the collection zone, they encounter the charged webs 31 and 32 and are attracted to and precipitated thereon.

The filter cell 16 is designed to be readily cleaned which may be easily accomplished by removing it from the forced-air system 11 and soaking it in a suitable detergent.

Figure 3:
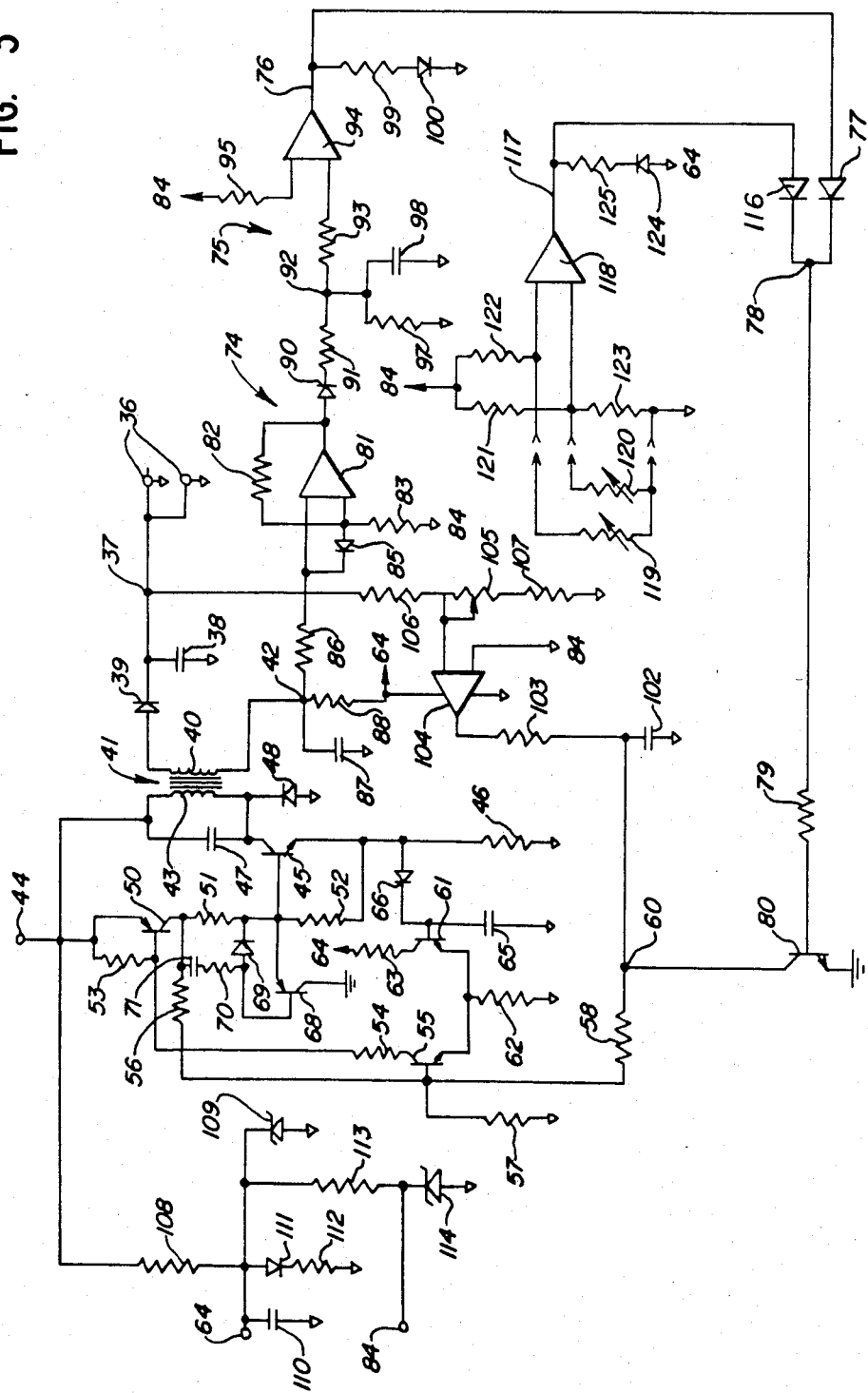
FIG. 3 is a schematic circuit diagram of a high voltage power supply and control unit of the system of FIG. 1.

FIG. 3 is a circuit diagram of the high voltage power supply and control unit 18. The unit 18 includes output terminals 36 which are connected through the cable 17 to the filter cell 16 and which are connected within the unit 18 to a circuit point 37. Circuit point 37 is connected through a capacitor 38 to ground and through a diode 39 to one end terminal of a secondary winding 40 of a transformer 41. The opposite terminal of the secondary winding 40 is connected to a circuit point 42 which is at a relatively low potential with respect to ground, being connected to circuitry used for current-monitoring purposes, as hereinafter described. A high voltage of alternating polarity is developed across the secondary winding which is rectified by the diode 39 to develop a high voltage at the circuit point 37 which may be on the order of plus 7,000 volts, by way of example.

The transformer 41 includes a primary winding 43 and is a step-up transformer which has a high ratio of turns in the secondary winding 40 relative to those in the primary winding 43. The primary winding 43 is connected between a positive low voltage power supply terminal 44 and the collector of a transistor 45 having an emitter connected through a resistor 46 to ground. A capacitor 47 is connected in parallel with the primary winding 43 and a damper diode 48 is connected between the collector of transistor 45 and ground.

To develop the high voltage in the secondary winding 40, the transistor 45 is periodically rendered conductive to cause current to build up through the primary winding 43, thereby developing a substantial amount of energy in the magnetic field of the transformer 41. Then when the current reaches a certain level, the conduction through transformer 45 is cut off and high amplitude pulse in the form of a half-cycle "ring" is produced, the duration of which is determined by the capacitance of the capacitor 47 and the effective inductance of the primary winding 43. This action is like that produced in the conventional "fly back" power supplies such as used in television receivers and the like.

To control conduction through the transistor 45, an oscillator circuit is provided which includes a transistor 50 having its emitter connected to the power supply terminal 44 and having its collector connected through a resistor 51 to the base of the transistor 45, a resistor 52 being connected between the base and emitter electrodes of the transistor 45. The base of the transistor 50 is connected through a resistor 53 to the power supply terminal 44 and is also connected through a resistor 54 to the collector of a transistor 55. The base of the transistor 55 is connected through a resistor 56 to the collector of transistor 50, through a resistor 57 to ground and through a resistor 58 to a circuit point 60 to which the control and reference voltages are applied as hereinafter described. The emitter of transistor 55 is connected to the emitter of another transistor 61 and also through a common resistor 62 to ground. The collector of transistor 61 is connected through a resistor 63 to a power supply terminal 64 to which a regulated voltage of plus 20 volts may be applied. The base of transistor 61 is connected through a capacitor 65 to ground and through a diode 66 to the emitter of the output transistor 45.

In the operation of the circuit as thus far described, it may be assumed that the transistor 55 is initially conductive to cause the transistor 50 to be conductive and to cause the output transistor 45 to be conductive and to build up current through the primary winding 43. With transistor 55 conductive, a potential is developed at its emitter which, with the capacitor 65 being initially uncharged, prevents transistors 61 from being conductive. However, as the current builds up through the primary winding 43, it also builds up through the resistor 46 to develop an increasing voltage across resistor 46 and across the capacitor 65. At a certain time, the base of the transistor 61 goes positive relative to its emitter to initiate conduction therethrough, increase conduction through the resistor 62 and to decrease the base-emitter bias of the transistor 55. Then the circuit is rapidly switched to a condition in which the transistor 61 conducts heavily while the transistor 55 is cut-off to cut-off conduction through the output transistor 45.

With this operation, in which the switching occurs in response to an increase in current flow through the output transistor 45 above a certain level, it is possible to so control and limit the current through the output transistor 45 as to prevent damage thereto, it being noted that the current might otherwise rise within a few microseconds to several amperes, which could cause the output transistor 45 to fail.

To further protect the output transistor 45, an additional transistor 68 is provided which acts as a clamping transistor, its emitter being connected to the base of the transistor 45 while its collector is connected to ground. The base of the transistor 68 is connected through a diode 69 to its emitter and is also connected through a resistor 70 and a capacitor 71 to the collector of the transistor 50. When transistor 50 is conductive, the capacitor 71 is charged through the dioe 69 to a polarity such that when the transistor 50 is cut off, the potential of the base of the transistor 68 is rapidly dropped to a negative value to cause the transistor 68 to conduct heavily and to clamp the potential of the base of the output transistor 45 at substantially ground potential, thereby precluding flow of current through the output transistor 45.

Another important feature of the invention relates to the control of the operation of the high voltage power supply circuit in response to excessive output current developed thereby. In an air filtering system of the type shown, it is found to be very important that the output current be limited because excessive current can cause damage to the filtering apparatus as well as to the power supply components and, more importantly, when an excessive current is the result of arcing in the filtering apparatus, there may be a generation of ozone and other deleterious effects. It is noted that periodic cleaning of the filter cell 16 is accomplished by soaking in a detergent and if the filter cell is not sufficiently dry when it is replaced in the system, the moisture may cause arcing to occur. At the same time, however, it is desirable to have the system operative as soon as possible and to not delay operation indefinitely while waiting for the filter cell to dry.

To limit the output current, a Schmitt trigger circuit 74 is provided which is triggered in response to an increase in the output current above a certain level to trigger a timer 75 from a reset condition to a set condition. The output of the timer 75, on a line 76, is applied through a diode 77 to a circuit point 78 which is connected through a resistor 79 to the base of a transistor 80, the emitter of transistor 80 being connected to ground and the collector thereof being connected to the circuit point 60 in the oscillator circuit. When the timer is in a set condition, the output thereof, on line 76, is at a high level and is applied through diode 77 and resistor 79 to the base of transistor 80 to render transistor 80 conductive and to clamp the potential of the circuit point 60 at a value close to ground potential. As a result, the base of the transistor 55 is held at a low potential, precluding operation of the oscillator circuits and precluding conduction of the output transistor 45.

The response time of the circuits 74 and 75 is quite fast and as a result, the output current can be rapidly cut off, precluding damage to components and other deleterious effects.

In the illustrated arrangement, the Schmitt trigger circuit 74 includes an operational amplifier 81 which has a plus input connected through a resistor 82 to its output and also through a resistor 83 to a regulated plus 12-volt supply terminal 84. The minus input of the operational amplifier 81 is connected through a diode 85 to its plus input and is also connected through a resistor 86 to the circuit point 42 which is connected through a capacitor 87 to ground and which is also connected through a resistor 88 to the plus 20-volt power supply terminal 64.

In operation, the output current flows through the resistor 88 to develop a voltage at the circuit point 42 which goes in a negative direction, i.e., decreases, as the output current is increased. When the potential of the circuit point 42 reaches a certain level, the operational amplifier 81 is rendered conductive. A positive output pulse is then developed at the output of the amplifier 81 which is applied through a diode 90 and a resistor 91 to a circuit point 92 which is connected through a resistor 93 to a plus input of an operational amplifier 94 which forms part of the timer circuit 75 and which has a minus input terminal connected through a resistor 95 to the plus 12-volt power supply terminal 84. The circuit point 92 is also connected to ground through the parallel combination of a resistor 97 and a capacitor 98 which controls the duration of the timing interval of operation of the timer 75.

When the positive output pulse is developed at the output of the operational amplifier 81, it is applied through diode 90 and resistor 91 to the circuit point 92, to rapidly charge up the capacitor 98 and to also render the operational amplifier 94 operative to develop a high level at the output line 76. Thereafter, the capacitor 98 may discharge through the resistor 97 until it is substantially completely discharged, whereupon the output level on line 76 drops to a low level to permit operation of the oscillator circuit in the manner as described hereinbefore.

It is noted that the output line 76 is connected to ground through a resistor 99 and a diode 100 which is a light-emitting diode and which indicates that the system is in a "drying" operation.

Another important feature of the system is in the control of the output voltage which is accomplished through control of the oscillator circuit to control the proportionate durations of the states thereof in which the output transistor 45 is conductive and non-conductive. More particularly, the level of the voltage at the circuit point 60 is controlled, circuit point 60 being connected through a capacitor 102 to ground and through a resistor 103 to the output of an operational amplifier 104 which has a plus input terminal connected to the plus 12-volt supply terminal 84. The minus input terminal of the operational amplifier 104 is connected to the movable contact and one end terminal of a potentiometer 105 and also through a resistor 106 to the circuit point 37, the other end terminal of potentiometer 105 being connected through a resistor 107 to ground. An adjustable voltage divider is thus provided in which the potential of the minus input of amplifier 104 is controlled as an adjustable fraction of the output voltage. As a result, the voltage level at the circuit point 60 is controlled to control the time of switching of the transistor 55 into conduction and to thereby effectively control the average output voltage.

Power supply circuitry is provided including the terminal 44 to which plus 24-volts is supplied from the separate low voltage power supply unit 22. Such circuitry connects the terminal 44 with the terminals 64 and 84 which respectively supply regulated voltages of plus 20-volts and plus 12-volts with respect to ground. In particular, the terminal 44 is connected through a resistor 108 with the terminal 64 which is connected to ground through a Zener diode 109 and a capacitor 110. The terminal 64 is also connected through a light-emitting diode 111 and a resistor 112 to ground, the diode 111 constituting a "Power-On" signal light. Terminal 64 is additionally connected through a dropping resistor 113 to the terminal 84 which is connected through a second Zener diode 114 to ground.

The circuitry of the power supply 22 is not illustrated but it will be understood that it may be of conventional form and, for example, it may preferably include a stepdown transformer, a bridge rectifier and a filter capacitor.

A further feature of the apparatus is in the provision of circuitry for deactivating the high voltage supply when no air is being passed through the filter cell, as when the blower 13 is inoperative. Such circuitry is connected through the cable 25 to the probe unit 24 which is hereinbefore described senses the flow of air within the duct 15. As shown in the circuit diagram of FIG. 3, the circuit point 78 is connected through a diode 116 to a line 117 connected to the output of a differential amplifier 118 having minus and plus inputs connected to ground through thermistors 119 and 120 which are physically located in the probe unit 24 in a manner as hereinafter described. The minus and plus inputs are also connected through resistors 121 and 122 to the plus 12-volt power supply terminal 84 and, as shown, an additional resistor 123 may be connected in parallel with the thermistor 120.

The thermistor 119 is in the path of air flow to the filter cell 16 and its temperature is reduced in response to air flow to cause its resistance to increase, the thermistor having a negative temperature coefficient of resistivity. The second thermistor 120 is in a protected position, out of the path of air flow, as hereinafter described. In operation, when there is no air flow, the thermistor 119 has a relatively low resistance, the potential of the plus input of the operational amplifier 118 is greater than that at the minus input thereof and the output on the line 117 is at a high level. As a result, a signal is applied through the diode 116 and resistor 79 to the base of the transistor 80 to cause the potential of the circuit point 60 to be clamped at a low level and to preclude operation of the high voltage supply. However, when there is air flow at greater than a certain velocity, the resistance of the thermistor 119 is increased to a level such that the output on line 117 goes to a low level, removing the signal from the base of the transistor 80, and allowing the high voltage supply to operate.

It is noted that the thermistors 119 and 120 have matched characteristics and manner of mounting thereof and the nominal resistance values thereof and of the resistors 121, 122 and 123 are such that the circuit is insensitive to changes in variables other than air flow velocity. Thus, changes in ambient temperature, for example, do not have any substantial effect on the operation of the circuit and a very high degree of reliability is obtained.

A specific feature is in the provision of a light-emitting diode 124 in series with a resistor 125 between the plus 20-volt power supply terminal 64 and the line 117. When the output on line 117 is at a high level due to the absence of air flow, the light-emitting diode 124 is de-energized but it is energized when the output drops to a low level in response to air flow. The diode 124 and also the diodes 100 and 111 are physically located behind openings at the inner central portions of recesses 126, 127 and 128 in a cover 130 of the power supply and control unit 18 shown in FIG. 4, indicia being provided on the cover 130 opposite the diodes 124, 100 and 111 to show that energization thereof indicates "OPERATING", "DRYING" and "POWER ON". This feature is highly advantageous in that a person using or servicing the apparatus can instantly determine its status from visual observation.

FIG. 5 illustrates the air sensing probe 24 which includes a housing 132 having a base portion 133 for positioning on the outside of a duct wall and having a sensor element support portion 134 of tubular form for insertion through an opening in a duct wall. The base portion 133 has holes 135 and 136 which may receive suitable sheet metal screws for securing the base portion 133 to the duct wall. The tubular portion 134 has slots 137 therein for allowing air to enter and to come in contact with the thermistor 120 which is supported at a protected position therewithin. The thermistor 119 is supported from the inner end of the tubular portion 134 by means of a support plug, the thermistor 119 having lead wires 139 and 140 secured to connecting elements within the plug 138. A generally U-shaped sensor guard 142 is secured to the support plug 138 to protect the thermistor 119. During shipment of the apparatus, a protective cap may be secured over the guard 142 and over the thermistor 119, the protective cap being removed when the apparatus is installed.

FIG. 6 shows the assembly of the probe 24. The lead wires 139 and 140 are secured to connectors 143 and 144 which are inserted into openings in the plug 138 and which are connected to mating connectors 145 and 146 secured to wires 147 and 148. The connector 145 is additionally secured to a lead wire 149 of the thermistor 120, a second lead wire 150 of thermistor 120 being secured to a wire 151. The wires 147, 148 and 151 extend from the cable 25 which, during assembly, is threaded through an opening in the base 133 and out through the tubular portion 134. Then the cable 25 is pulled downwardly and outwardly to position the thermistor 120 down within the tubular portion 134. Thermistor 120 is thus placed at a protected position out of the path of high velocity air flow. However, some degree of air circulation to the thermistor 120 is provided through the slots 137.

The opposite ends of the wires 147, 148 and 151 are connected to prongs of a plug 152 which is engaged in a suitable socket of the high voltage supply and control unit 18.

With the illustrated construction of the probe unit, it may be readily installed by any experienced "do-it-yourselfer" or professional. An important advantage of the arrangement is that the probe may be positioned at a point in the air flow path which is spaced a substantial distance from the filter cell, away from any obstructions, so as to obtain an accurate and reliable measurement of the mean air flow velocity in the forced-air system. Another advantage is that a probe, once installed, is not affected by cleaning operations performed on the filter cell and the possibility of being adversely affected by moisture or the like is minimized. Also, the thermistors, once installed, are not subjected to possible damage from handling.

Figure 7:
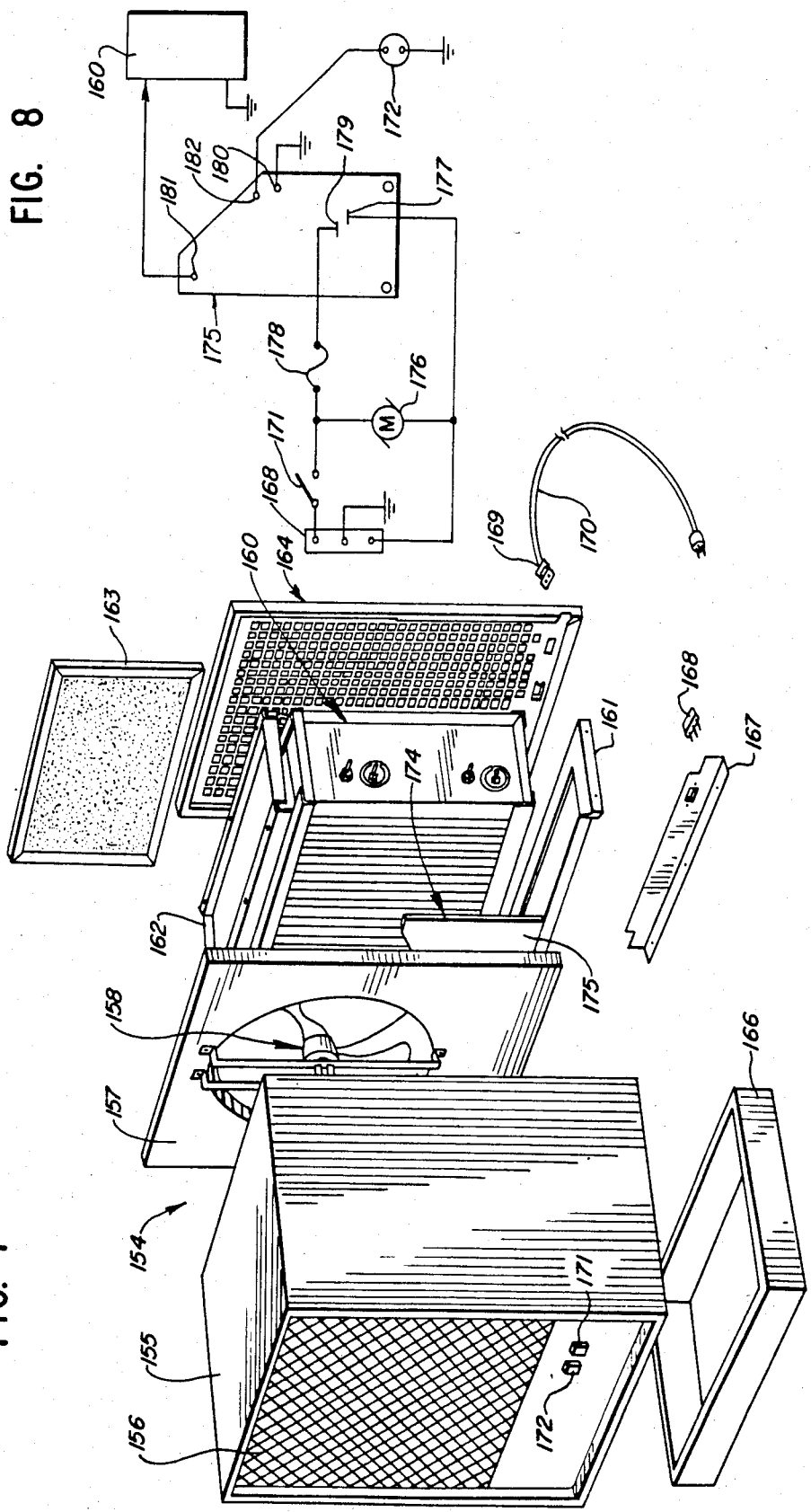
FIG. 7 is an expanded perspective view illustrating principal components of a portable air cleaner apparatus of the invention and the manner of assembly thereof.

FIG. 7 shows the principal components of a portable air cleaner apparatus constructed in accordance with the principles of the invention and generally designated by reference numeral 154. The apparatus 154 includes a housing or cabinet 155 which has a screen 156 forming a part of a front wall thereof. A blower panel 157 is mounted behind the front wall of the cabinet and supports a blower 158 which is driven by a suitable motor, not seen. A filter and collector cell 160 is mounted behind the blower 158, between lower and upper retainers 161 and 162 and a charcoal filter 163 may be mounted behind the filter and collector cell 160. A rear screen 164 is mounted on the rear of the cabinet 155 to enclose the components as illustrated. The cabinet 155 may be supported on a base assembly 166 and a member 167 may be provided for mounting between the rear end of the base assembly 166 and the rear end of the cabinet 155 for retaining the lower end of the rear screen 164 and also for supporting a power cord retainer 168 which is connectable to a connector 169 at one end of a power cord 170. A switch 171 and a panel lamp 172 may be mounted on the front of the cabinet below the screen 156.

The filter and collector cell 160 may have a construction generally similar to that of the cell 16 in the apparatus 10 but may be relatively thicker, as shown, to take advantage of the fact that more space can be provided in a portable unit than is available when the filter cell replaces an ordinary disposable filter in a forced-air system.

To supply high voltage to the cell 160, a high voltage supply unit 174 is provided which includes components mounted on a circuit board 175 arranged for mounting on the rear face of the blower-support panel 157.

Figure 8:
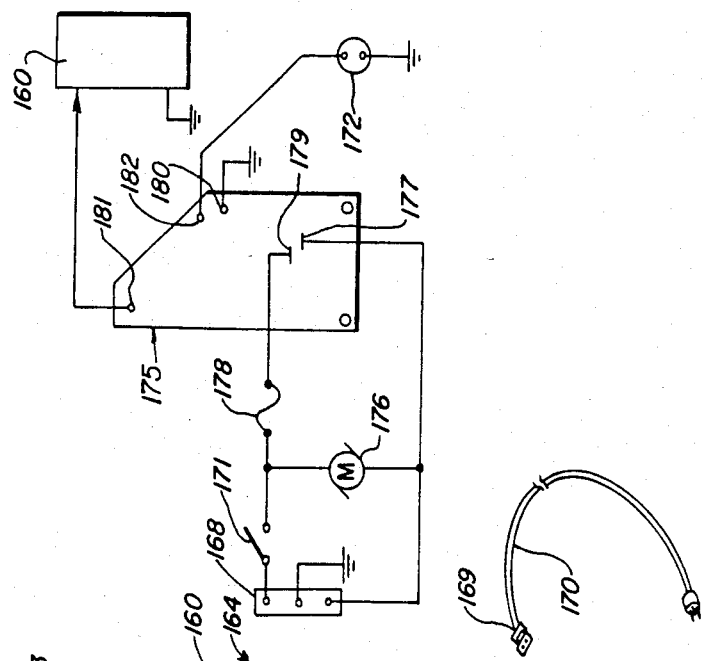
FIG. 8 is a wiring diagram for the apparatus of FIG. 7.

As shown in FIG. 8, one terminal of the power socket 168 is connected to one terminal of a motor 176 for driving the blower 158 and is also connected to one terminal 177 of the circuit board 175. A second terminal of the power socket 168 is connected to ground, i.e., to the frame of the apparatus, and a third terminal thereof is connected through the switch 171 to the other terminal of the motor 176 and also through a fuse 178 to a second terminal 179 of the circuit board 175. The circuit board 175 also has a terminal 180 connected to ground, a terminal 181 which is connected to a high voltage terminal of the cell 160 and a terminal 182 which is connected to the panel light 172.

Figure 9:
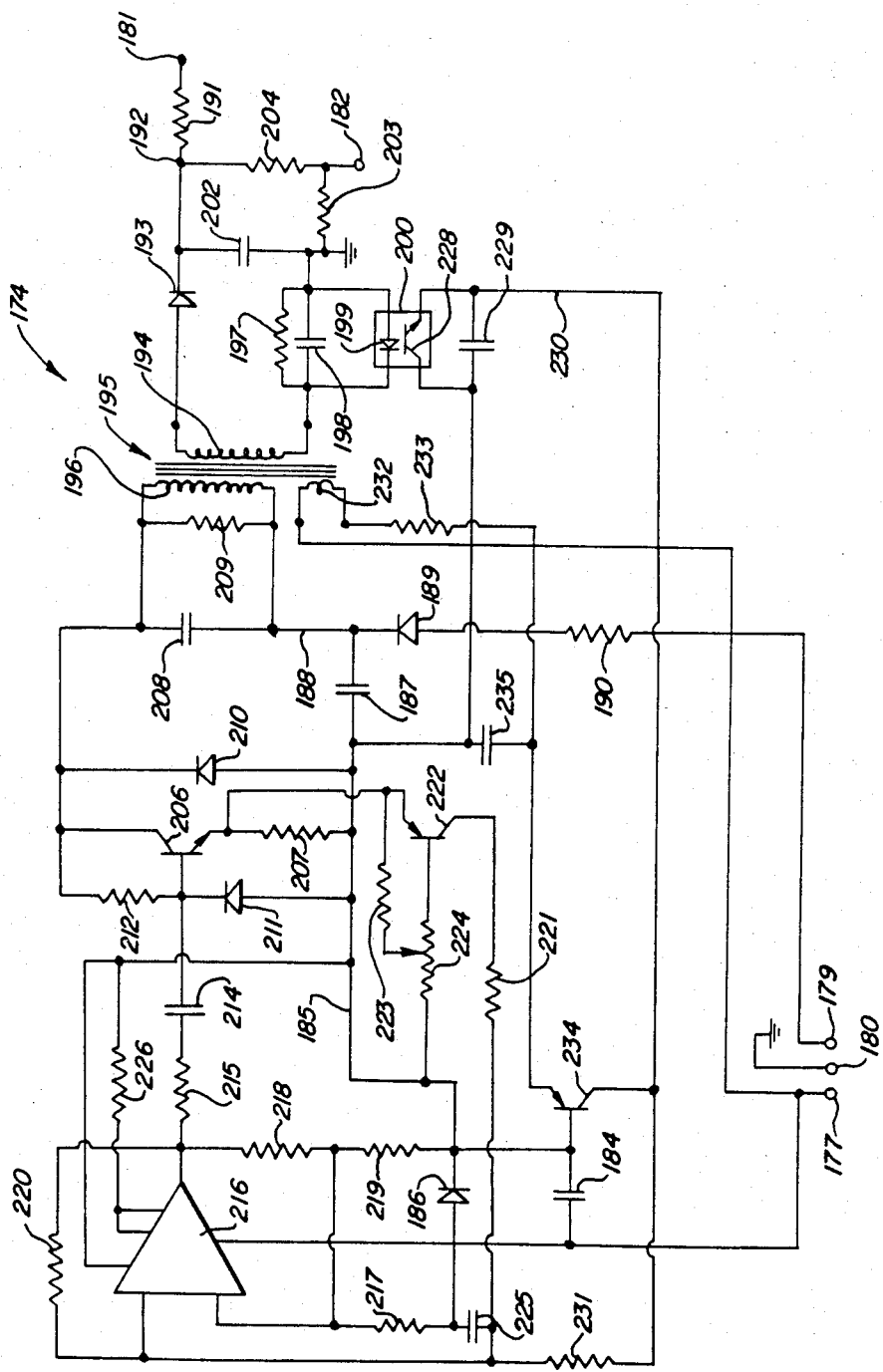
FIG. 9 is a schematic circuit diagram of a high voltage power supply unit of the apparatus of FIGS. 7 and 8.

FIG. 9 illustrates the electrical circuitry of the high voltage supply 174. The circuitry is arranged for obtaining supply voltages by direct rectification of the 120-volt AC supply voltage. An important feature is that it includes two power supply or supply voltage sections connected in series. The first section includes a capacitor 184 connected between the terminal 177 and a line 185 with a Zener diode 186 being connected in parallel with the capacitor 184 to regulate the voltage thereacross. The second section includes a capacitor 187 connected between the line 185 and a line 188 which is connected through a rectifying diode 189 and a resistor 190 to the second line terminal 179.

In operation, the input line voltage is half-wave rectified by the rectifier 189 to produce a DC voltage, one portion of which is developed across the capacitor 184, between terminal 177 and line 185, while a second portion thereof is developed across capacitor 187, between line 185 and line 188. The portion developed across the capacitor 184 is maintained at a regulated value by the Zener diode 186, and may be 8.2 volts, by way of example. The second portion is unregulated.

The circuitry 174 is, in many respects, similar to the circuitry of the high voltage supply 18, illustrated in FIG. 3. The high voltage output terminal 181 is connected through a resistor 191 to a circuit point 192 which is connected through a rectifying diode 193 to one end terminal of a secondary winding 194 of a high voltage step-up transformer 195 having a primary winding 196. The other terminal of the secondary winding 194 is connected to ground through the parallel combination of a resistor 197, a capacitor 198 and an input light-emitting diode portion 199 of an optical coupler 200. A filter capacitor 202 is connected between circuit point 192 and ground and the lamp terminal 182 is connected through a resistor 203 to ground and through a resistor 204 to the circuit point 192.

To energize the primary winding 196 of the transformer 195, one terminal thereof is connected to the power supply line 188 while the other terminal thereof is connected to the collector of a transistor 206, the emitter of which is connected through a resistor 207 to the power supply line 185. Thus, the second power supply section is used for supplying current to the primary winding 196 under control of the transistor 206 which functions in a manner very similar to the output transistor 45 of the circuit of FIG. 3. A capacitor 208 and also a resistor 209 are connected in parallel with the primary winding 196 and a damper diode 210 is connected between the collector of transistor 206 and the power supply line 185.

Conduction of the transistor 206 is controlled by an oscillator circuit which is similar to that of the circuit shown in FIG. 3. The base of the transistor 206 is connected through a diode 211 to the power supply line 185 and is connected through a resistor 212 to the collector thereof. In addition, the base of the transistor 206 is connected through a coupling capacitor 214 and a resistor 215 to the output of an operational amplifier 216 which is operated from the first power supply section, one power supply input terminal thereof being connected to the line terminal 177 and the other power supply input terminal thereof being connected to the line 185. Bias and feedback voltages are applied to the plus input of the operational amplifier 216 which is connected through a resistor 217 to the terminal 177, through a resistor 218 to its output terminal and through a resistor 219 to the line 185. The minus input of the operational amplifier 216 is connected through a resistor 220 to its output and is also connected through a resistor 221 to the collector of a transistor 222, the emitter of which is connected to the emitter of transistor 206 and also through a resistor 223 to the movable contact of a potentiometer 224 connected between the base of transistor 222 and the line 185. A capacitor 225 is connected between the minus input of amplifier 216 and ground. An additional resistor 226 is connected between line 185 and terminals of the amplifier 216.

The operational amplifier 216 is connected to operate as a free-running multivibrator between a first state in which its output is high and a second state in which its output is low. The frequency is determined primarily by the values of the resistors 217, 218, 219 and 220 and the value of the capacitor 225 but the frequency is also controlled, in part, by a feedback circuit from the output transistor 206, including the transistor 222.

In operation of the circuitry as thus far described, when the output of the amplifier 216 goes high, a signal is applied through resistor 215 and capacitor 214 to the base of the output transistor 206 to cause current to rise in the primary winding 196 of transformer 195. Current flows through the resistor 207 and the voltage thereacross rises and is transmitted, through the operation of the transistor 222, to the minus input of the amplifier 216 to turn the amplifier 216 off and to discontinue conduction of the output transistor 206. The magnitude of the current required for this operation and thereby the timing are controlled by adjustment of the potentiometer 224 which serves as an output voltage adjustment potentiometer since the magnitude of the output voltage is a function of the "on" time versus the "off" time of transistor 206.

In addition to the adjustable control of output voltage, an automatic current control circuit is provided which includes the optical coupler 200 having its input diode 199 coupled in parallel with the resistor 197 in series in the output circuit, to sense the output current. The optical coupler 200 also includes an output phototransistor 228 connected in parallel with a capacitor 229 between the line 185 and a line 230 which is connected through a resistor 231 to the minus input of the operational amplifier 216. When the output current is higher than an amount determined by resistor 197, which may be about 2.0 ma, the light emitted by the diode 199 causes the phototransistor 228 to conduct and a current is applied through the resistor 231 to make the minus input of the amplifier 216 more positive and to cause it to shift from one state to another at an earlier time and to reduce the output voltage which, in turn, reduces the output current.

Another control circuit is provided for limiting the maximum open circuit voltage. In particular, a feedback winding 232 is provided on the transformer 195, one terminal of which is connected to the line terminal 177 and the other terminal of which is connected through a resistor 233 to the emitter of a transistor 234, the collector of which is connected to the line 230 and the base of which is connected to the line 185. A capacitor 235 is connected between the emitter of transistor 234 and the line 185. Through the winding 232 and the transistor 234, a control voltage is applied through the resistor 231 to the minus input of amplifier 216 in a manner such as to limit the output voltage during open circuit conditions.

It will be understood that modifications and variations may be perfected without departing from the spirit and scope of the novel concepts of this invention.

We claim as our invention:

1. Air filtering apparatus for use in a forced air system, said apparatus comprising: a filter cell including ionizing and collecting means, a high voltage power supply connected to said ionizing and collecting means, and control means connected to said power supply for controlling activation of said power supply, said ionizing and collecting means of said filter cell having elements arranged with respect to each other to cause ozone generation to occur due to arcing caused by moisture and particulate matter and also by the existence of a cleaning solution in the filter cell prior to drying thereof, said control means comprising timer means operative between reset and set conditions and having an output at which an output signal of a predetermined form is developed only in said set condition, a coupling between said output of said timer means and said high voltage power supply arranged to prevent activation of said power supply when said output signal of predetermined form is developed in said set condition of said timer means, current sensing means coupled between said high voltage supply and said ionizing and collecting means and arranged to develop a triggering signal in response to excessive current resulting from an arcing condition in said ionizing and collecting means, and means for applying said triggering signal to said timer means to rapidly switch said timer means to said set condition and to prevent activation of said power supply at any time when an excessive current condition is developed, said timer means being so constructed and arranged as to be thereafter maintained in said set condition for a long time interval of at least an order of magnitude equal to the minimum time required for drying of said filter cell after cleaning thereof to prevent rapidly repeated reactivation of said power supply under any conditions.

2. In apparatus as defined in claim 1, further including air flow sensing means for sensing air flow through said filter cell and arranged to develop an output signal of a predetermined form when the velocity of air flow is below a certain value, and a coupling between said air flow sensing means and said high voltage supply arranged to prevent activation of said high voltage power supply when said output signal of predetermined form is developed by said air flow sensing means.

3. In apparatus as defined in claim 2, further including a first signal device connected to said high voltage power supply and energized when said high voltage power supply is activated for indicating that said apparatus is in an "operating" condition, and a second signal device connected to said high voltage power supply and energized when said high voltage supply is deactivated by said control means to indicate that said apparatus is in a "drying" condition.

4. In apparatus as defined in claim 3, further including a low voltage power supply connected to said high voltage power supply for supplying a low energizing voltage to said high voltage power supply, and a third signal device connected to said high voltage power supply and energized when said low voltage power supply is energized for indicating that said apparatus is in a "power-on" condition.

5. In apparatus as defined in claim 2, said output signals of predetermined form developed by said timer means and said air flow sensing means being high level signals, said control means for said power supply including a transistor arranged to operate as a clamp when conductive to prevent activation of said power supply, and said couplings between said timer and air flow sensing means and said high voltage supply comprising a pair of diodes for applying either of said high level output signals to said transistor to render said transistor conductive and to operate as a clamp to prevent activation of said power supply.

* * * * *